United States Patent Office 3,560,579
Patented Feb. 2, 1971

3,560,579
PROCESS FOR PREPARING META-HALOTOLUENE
John D. Bacha, Monroeville, and Charles M. Selwitz, Pitcairn, Pa., assignors to Gulf Research & Development Company, Pittsburgh, Pa., a corporation of Delaware
No Drawing. Filed Dec. 20, 1968, Ser. No. 785,793
Int. Cl. C07c 25/00, 25/04
U.S. Cl. 260—650                                 11 Claims

ABSTRACT OF THE DISCLOSURE

A process for isomerizing ortho-halotoluene or para-halotoluene to meta-halotoluene which involves contacting the ortho-halotoluene or para-halotoluene with hydrogen fluoride, boron trifluoride and halobenzene.

---

Halotoluene can exist as three isomeric forms, namely, as ortho-, meta-, or para-halotoluene. Of these meta-halotoluene is extremely attractive commercially because it can be hydrolyzed to meta-cresol. Meta-cresol is known to react with formaldehyde to form phenolic resins. Whereas the ortho- or para-methyl groups in phenolic aromatics hinder the condensation with formaldehyde and also block attack at the ortho- or para- positions, meta-cresol does not have this problem and, in fact, condenses with formaldehyde at a rate which is three times as fast as phenol itself.

We have found that ortho- and para-halotoluene, singly or in combination, can be isomerized to meta-halotoluene by the mere expedient of contacting the same with HF, $BF_3$ and halobenzene. By "halotoluene" we intend to include monochloro-, bromo-, fluoro- and iodotoluenes. By halobenzene we intend to include monochloro-, bromo-, fluoro-, and iodobenzenes. The halogen on the halobenzene used during the isomerization procedure defined herein must be identical to the halogen on the halotoluene charge. In a preferred embodiment the charge is an ortho- or para-chlorotoluene and the halobenzene present is monochlorobenzene.

The isomerization reaction defined herein is effectively carried out merely by bringing the halotoluene charge in contact with the halobenzene, the HF and $BF_3$. Thus, in a preferred embodiment anhydrous HF is added to a closed reactor containing the halotoluene charge and the halobenzene, after which $BF_3$ gas is added thereto. The molar ratio of HF to $BF_3$ used in the isomerization reaction can be from about 1:1 to about 100:1, preferably from about 2:1 to about 10:1. The molar ratio of HF and $BF_3$ (as a combined entity) to the halotoluene charge can be from about 1:1 to about 100:1, preferably from about 5:1 to about 50:1. The molar ratio of halobenzene to halotoluene charge can be from about 0.2:1 to about 4:1, preferably from about 0.5:1 to about 2:1. The contents of the reactor are stirred during the course of the reaction, with the temperature being as low as about 25° C. or as high as about 160° C., but preferably remaining in the range of about 100° to about 140° C. Below about 25° C. the reaction rate is too slow, whereas at temperatures in excess of about 160° C. dehydrohalogenation and the formation of decomposition products and polymers is facilitated. Pressure is not critical and can be as low as about 15 pounds per square inch gauge to as high as about 1200 pounds per square inch gauge, or even higher, but preferably is maintained within a range of about 100 to about 800 pounds per square inch gauge. In effect any pressure sufficient to maintain the HF in the liquid phase can be employed. The reaction time is highly dependent upon the other factors discussed herein and can therefore be varied over a wide range, although in general a time of about ten minutes to about five hours, preferably about thirty minutes to about three hours can be used.

At the end of the reaction period stirring is terminated and three phases are found. The lower phase is a liquid containing one or any combination of the three isomeric halotoluenes, halobenzene and disproportionation products, if any. The disproportionation products can be halobenzene (added and/or formed during the course of the reaction) and/or one or more of the isomeric forms of a haloxylene. The intermediate layer is also a liquid and contains liquid HF having dissolved therein from about 15 to about 65 percent by weight of a complex composed of HF, $BF_3$ and meta-halotoluene, with the remainder made up of any one or combination of other isomeric halotoluenes and any disproportionation products, if formed, complexed with HF and $BF_3$. The upper phase is composed almost wholly of $BF_3$, which under the conditions of the reaction defined herein is always in the gaseous phase. The meta-halotoluene may be isolated by any suitable procedure, such as the following. The contents of the reactor are cooled to room temperature, pressure is released and the HF and $BF_3$ is thereby removed therefrom as gases. The remainder of the mixture can then be subjected to distillation under any suitable conditions, for example, a pressure of about five to about 30 pounds per square inch gauge, preferably about 10 to about 15 pounds per square inch gauge, at a temperature of about 50° to about 250° C., preferably about 100° to about 180° C. Left behind after the distillation is completed is the desired isomer, meta-halotoluene, which can be converted, for example, by hydrolysis, to meta-cresol.

In order to obtain the desired meta-halotoluene isomer it is absolutely necessary that the isomerization defined herein be carried out in the presence of a holobenzene. Without the halobenzene, the reaction defined herein will not be sufficiently selective to obtain the desired meta-halotoluene isomer and there will be a tendency for the meta-halotoluene to disproportionate to halobenzene and haloxylenes. With halobenzene present there will be an increase in the amount of meta-halotoluene formed and a decrease in the disproportionation of halotoluene charge. The effect of halobenzene in this context could not have been predicted. Statistically, if halobenzene and halotoluene are precent in equal amounts, one-half of the methyl groups lost from halotoluene might be expected to travel and attach themselves to the halobenzene and therefore only one-half of the methyl groups lost to disproportionation should be lost in such a situation. We have found, however, that one equivalent of halobenzene reduces the loss of halotoluene to disproportionation far beyond one-half. The above, furthermore, assumes equal reactivity for both halobenzene and halotoluene toward electrophilic aromatic substitution. Knowledge of substituent effects, however, predicts halobenzene to be less reactive than halotoluene, i.e., it should be a less likely recipient of a cationic methyl group than chlorotoluene. Thus, halobenzene should have less than the statistical effect we have indicated above, that is, exactly opposite to the results we have obtained.

The process defined herein can further be illustrated by the following. In a typical run, chlorobenzene and chlorotoluene were placed in a 300-milliliter stainless steel autoclave equipped with a stirrer, an internal cooling coil and an external heating mantle. After cooling to less than 0° C., anhydrous HF was condensed into the reactor and $BF_3$ was pressured in, the amounts charged being determined by the weight losses of the lecture bottles from which each material was taken. Heat was applied to the stirred reactor until the indicated temperature was reached and that temperature was maintained for the indicated time. The pressure that developed within the reactor at the indicated temperature is recorded. The reactor was then cooled to less than 0° C. and the product withdrawn by way of a bottom drain onto cracked ice in a polyethylene vessel. The resulting aqueous HF, chloroaromatic mixture was extracted at least twice with aliquots of light hydrocarbon (hexane), the extracts combined and washed free of acid with water, two percent aqueous sodium bicarbonate and water again and finally dried over sodium sulfate. This hydrocarbon solution of chloroaromatic products was analyzed by gas chromatography employing a 40′ x ⅛″ stainless steel column packed with 15 percent p-azoxyanisole on acid washed, 30/60 mesh chromosorb W and operated at 120° C. The results obtained are tabulated in the table below.

(Runs 11 and 19 vs. Run 21) resulted in further reduction of disproportionation with only slight reduction in isomerization. The influence of HF proportion on isomerization and disproportionation with one equivalent of chlorobenzene added at 120° C. was examined (Runs Nos. 13 to 16). The influence of $BF_3$ over a narrow range was similarly examined in Runs Nos. 15, 17 and 18. The effect of residence time was also investigated in Runs Nos. 15, 22 and 23. The effectiveness of chlorobenzene to drastically reduce losses to disproportionation while only slightly affecting isomerization at higher temperatures (148° to 160° C.) with short contact time (0.2 to 0.3 hour) has been demonstrated in Runs Nos. 24 to 27 and 30. The influence of varying $BF_3$ proportions under these conditions was found to have only minor effects on either

| Run No. | Charge, mols | | | | Molar ratios | | | Temp., °C. | Pressure, p.s.i.[1] | Time, hours[2] | Product, mol percent | | | | Chlorotoluene isomer distribution | | |
|---|---|---|---|---|---|---|---|---|---|---|---|---|---|---|---|---|---|
| | CT | CB | HF | $BF_3$ | CB/CT | HF/CT | $BF_3$/CT | | | | CT | CB[3] | CB[4] | CX[4] | Ortho | Meta | Para |
| 1 | 0.295 | 0 | 1.62 | 0.263 | 0 | 5.5 | 0.891 | 57 | 350 | 1.6 | 100 | 0 | 0 | 0 | 100 | 0 | 0 |
| 2 | 0.295 | 0 | 1.80 | 0.528 | 0 | 6.1 | 1.79 | 53 | 600 | 2.0 | 100 | 0 | 0 | 0 | 100 | 0 | 0 |
| 3 | 0.293 | 0 | 1.74 | 0.406 | 0 | 5.9 | 1.38 | 93 | 600 | 2.0 | 100 | 0 | <0.5 | <0.5 | 74 | 21 | 5 |
| 4 | 0.298 | 0 | 1.84 | 0.339 | 0 | 6.2 | 1.14 | 124 | 690 | 3.0 | 86 | 0 | 7 | 7 | 42 | 41 | 17 |
| 5 | 0.299 | 0 | 1.82 | 0.324 | 0 | 6.1 | 1.08 | 148 | 860 | 3.0 | 68 | 0 | 16 | 16 | 40 | 42 | 18 |
| 6[5] | 0.292 | 0 | 1.83 | 0.385 | 0 | 6.3 | 1.32 | 111 | 760 | 3.0 | 77 | 0 | 12 | 12 | 38 | 45 | 17 |
| 7[5] | 0.293 | 0 | 1.83 | 0.158 | 0 | 6.3 | 0.593 | 112 | 450 | 3.0 | 85 | 0 | 7 | 7 | 26 | 53 | 21 |
| 8 | 0.128 | 0 | 0.750 | 0.223 | 0 | 5.86 | 1.74 | 100 | 390 | 2.0 | 98 | 0 | 1 | 1 | 89.3 | 9.1 | 1.6 |
| 9 | 0.169 | 0 | 1.77 | 0.381 | 0 | 10.5 | 2.25 | 100 | 560 | 2.0 | 90 | 0 | 5 | 5 | 63.7 | 27.7 | 8.6 |
| 10 | 0.086 | 0 | 1.78 | 0.411 | 0 | 20.7 | 4.78 | 100 | 590 | 2.0 | 76 | 0 | 11 | 11 | 52.7 | 35.5 | 11.8 |
| 11 | 0.062 | 0 | 1.26 | 0.386 | 0 | 20.5 | 6.26 | 120 | 650 | 2.0 | 60 | 0 | 20 | 20 | 44.5 | 40.6 | 14.9 |
| 12 | 0.130 | 0 | 0.825 | 0.233 | 0 | 6.35 | 1.79 | 120 | 490 | 2.0 | 92 | 0 | 4 | 4 | 72.0 | 21.8 | 6.2 |
| 13 | 0.170 | 0.169 | 0.995 | 0.336 | 0.99 | 5.85 | 1.98 | 120 | 630 | 2.0 | 51.0 | 49.0 | <0.2 | <0.2 | 78.8 | 17.2 | 4.0 |
| 14 | 0.171 | 0.169 | 0.199 | 0.372 | 0.99 | 11.6 | 2.18 | 120 | 640 | 2.0 | 50.3 | 48.1 | 0.8 | 0.8 | 49.1 | 37.0 | 13.9 |
| 15 | 0.171 | 0.167 | 2.11 | 0.389 | 0.98 | 12.3 | 2.27 | 120 | 670 | 1.0 | 51.7 | 47.9 | 0.2 | 0.2 | 60.1 | 29.6 | 10.3 |
| 16 | 0.171 | 0.168 | 3.05 | 0.392 | 0.99 | 17.8 | 2.29 | 120 | 650 | 2.0 | 48.8 | 47.4 | 1.9 | 1.9 | 42.0 | 41.5 | 16.5 |
| 17 | 0.119 | 0.117 | 1.39 | 0.406 | 0.98 | 11.7 | 3.41 | 120 | 630 | 2.0 | 50.6 | 46.2 | 1.6 | 1.6 | 53.4 | 34.6 | 12.3 |
| 18 | 0.119 | 0.117 | 1.57 | 0.102 | 0.98 | 13.2 | 0.86 | 120 | 320 | 2.0 | 51.5 | 48.5 | <0.1 | <0.1 | 83.1 | 14.0 | 2.9 |
| 19 | 0.047 | 0.045 | 1.10 | 0.291 | 0.96 | 23.6 | 6.24 | 120 | 560 | 1.0 | 50.2 | 47.2 | 1.3 | 1.3 | 59.8 | 30.0 | 10.2 |
| 20 | 0.044 | 0.088 | 0.680 | 0.231 | 1.99 | 15.4 | 5.24 | 120 | 490 | 2.0 | 35.0 | 65.0 | <0.2 | <0.2 | 78.8 | 17.0 | 4.2 |
| 21 | 0.045 | 0.088 | 1.08 | 0.264 | 1.96 | 24.0 | 5.86 | 120 | 520 | 2.0 | 34.4 | 64.2 | 0.7 | 0.7 | 56.6 | 32.2 | 5.0 |
| 22 | 0.092 | 0.090 | 1.02 | 0.325 | 0.98 | 11.1 | 3.54 | 120 | 610 | 2.0 | 51.6 | 46.2 | 1.1 | 1.1 | 61.7 | 28.6 | 9.7 |
| 23 | 0.085 | 0.084 | 1.06 | 0.315 | 0.98 | 12.4 | 3.69 | 120 | 580 | 3.7 | 47.8 | 48.0 | 2.1 | 2.1 | 51.5 | 35.4 | 13.1 |
| 24 | 0.171 | 0 | 1.98 | 0.348 | 0 | 11.6 | 2.03 | 148 | 785 | 0.3 | 80.3 | 0 | 10.6 | 9.1 | 48.3 | 38.1 | 13.6 |
| 25 | 0.171 | 0.085 | 1.98 | 0.315 | 0.49 | 11.6 | 1.83 | 148 | 720 | 0.3 | 63.7 | 32.5 | 1.9 | 1.9 | 59.1 | 30.4 | 10.5 |
| 26 | 0.171 | 0.169 | 1.95 | 0.307 | 0.98 | 11.4 | 1.80 | 148 | 740 | 0.3 | 51.0 | 47.4 | 0.8 | 0.8 | 63.0 | 27.6 | 9.0 |
| 27 | 0.119 | 0.117 | 1.64 | 0.248 | 0.98 | 13.8 | 2.08 | 147 | 650 | 0.2 | 51.4 | 48.0 | 0.3 | 0.3 | 70.0 | 23.0 | 7.4 |
| 28 | 0.119 | 0.117 | 1.43 | 0.340 | 0.98 | 12.0 | 2.85 | 148 | 790 | 0.3 | 50.4 | 48.4 | 0.6 | 0.6 | 62.5 | 28.1 | 9.7 |
| 29 | 0.171 | 0.169 | 1.92 | 0.183 | 0.98 | 11.2 | 1.07 | 148 | 600 | 0.3 | 51.3 | 48.3 | 0.2 | 0.2 | 72.5 | 21.2 | 6.4 |
| 30 | 0.119 | 0.117 | 1.57 | 0.190 | 0.98 | 13.2 | 1.60 | 160 | 700 | 0.3 | 51.6 | 47.4 | 0.5 | 0.5 | 67.1 | 25.2 | 7.3 |

[1] Pressure reached at indicated temperature.
[2] Residence time at indicated temperature.
[3] Chlorobenzene from charge.
[4] Chlorobenzene or chloroxylene formed as a result of disproportionation.
[5] Para-chlorotoluene charged, all others employ ortho-chlorotoluene.

NOTE: CT = Chlorotoluene; CB = Chlorobenzene; CX = Chloroxylene.

The data in the above table clearly illustrate the advantages of operation in accordance with the defined procedure. The initial results in Runs Nos. 1 and 2 show that below 60° C. no detectable amount of isomerization of o-chlorotoluene (OCT) occurs. At elevated temperatures, other variables remaining essentially constant, isomerization occurs and is accompanied by varying amounts of disproportionation (Runs Nos. 3 to 5). Isomerization of p-chlorotoluene similarly occurs at 111° to 112° C. A m-chlorotoluene rich product was realized, accompanied by varying amounts of chloroxylene and chlorobenzene from disproportionation (Runs Nos. 6 and 7). Further experimentation revealed that the degree of isomerization and accompanying disproportionation is influenced not only by temperature, but also by the catalyst proportions at 100° and 120° C. (Runs Nos. 8 to 10 and 11 and 12, respectively). At similar catalyst proportions, the run at 120° C. resulted in greater isomerization and disproportionation than that at 100° C. (Run 8 vs. Run 12). The effect of chlorobenzene added to the system at 120° C. is indicated by the runs that follow. At low catalyst proportions, one equivalent of chlorobenzene (Runs 12 and 13) reduced the disproportionation from 8 percent to less than 0.2 percent while the degree of isomerization was only slightly affected. At higher catalyst proportions, one equivalent of chlorobenzene (Runs 11 and 19) reduced the disproportionation from 40 percent to 2.6 percent, again only slightly affecting the degree of isomerization. Similarly, two equivalents of chlorobenzene the disproportionation or isomerization reactions in Runs Nos. 26, 28 and 29.

Obviously many modifications and variations of the invention, as hereinabove set forth, can be made without departing from the spirit and scope thereof, and therefore only such limitations should be imposed as are indicated in the appended claims.

We claim:

1. A process for isomerizing a monohalotoluene charge to the corresponding monometahalotoluene which comprises contacting said charge and a monohalobenzene with anhydrous liquid HF and $BF_3$ at a temperature of about 25° to about 160° C., the molar ratio of HF to $BF_3$ being about 1:1 to about 100:1, the molar ratio of combined HF and $BF_3$ to monohalotoluene being about 1:1 to about 100:1 and the molar ratio of monohalobenzene to monohalotoluene being about 0.2:1 to about 4:1.

2. The process of claim 1 wherein said halotoluene charge is ortho-halotoluene.

3. The process of claim 1 wherein said halotoluene charge is para-halotoluene.

4. The process of claim 1 wherein said halotoluene charge is ortho-chlorotoluene.

5. The process of claim 1 wherein said halotoluene charge is para-chlorotoluene.

6. The process of claim 1 wherein the halobenzene is chlorobenzene.

7. The process of claim 1 wherein the charge is a chlorotoluene, the halobenzene is chlorobenzene and such contact is made at a temperature of about 100° to about 140° C.

8. The process of claim 1 wherein the charge is chlorotoluene and the residence time is about ten minutes to about five hours.

9. The process of claim 1 wherein the charge is chlorotoluene and the molar ratio of HF to $BF_3$ is about 2:1 to about 10:1.

10. The process of claim 1 wherein the charge is chlorotoluene and the molar ratio of combined HF and $BF_3$ to the chlorotoluene charge is about 5:1 to about 50:1.

11. The process of claim 1 wherein the charge is chlorotoluene and the molar ratio of chlorobenzene to chlorotoluene is about 0.5:1 to about 2:1.

References Cited
UNITED STATES PATENTS

| | | | |
|---|---|---|---|
| 2,727,075 | 12/1955 | Mattano | 260—650 |
| 2,819,321 | 1/1958 | Pray | 260—650 |
| 2,881,224 | 4/1959 | McCaulay | 260—650 |

HOWARD T. MARS, Primary Examiner

U.S. Cl. X.R.

252—433

PO-1050
(5/69)

UNITED STATES PATENT OFFICE
CERTIFICATE OF CORRECTION

Patent No. ___3,560,579___  Dated ___February 2, 1971___

Inventor(s) ___John D. Bacha and Charles M. Selwitz___

It is certified that error appears in the above-identified patent and that said Letters Patent are hereby corrected as shown below:

All of the following errors appear in the TABLE spanning columns 3 and 4:

Run No. 6, under column "$CB^4$", "12" should be "11".

Run No. 7, under column "$CB^4$", "7" should be "8".

Run No. 10, under column "$CB^4$", "11" should be "13".

Run No. 19, under column "CB", "9.045" should be "0.045".

Run No. 21, under "Para", "5.0" should be "11.2".

Run No. 26, under "Para", "9.0" should be "9.4".

Run No. 27, under "Para", "7.4" should be "7.0".

Run No. 28, under "Para", "9.7" should be "9.4".

Run No. 29, under "Para", "6.4" should be "6.3".

Run No. 30, under "Para", "7.3" should be "7.7".

Signed and sealed this 14th day of September 1971.

(SEAL)
Attest:

EDWARD M. FLETCHER, JR.
Attesting Officer

ROBERT GOTTSCHALK
Acting Commissioner of Paten